US007671343B2

(12) United States Patent
Satoh

(10) Patent No.: US 7,671,343 B2
(45) Date of Patent: Mar. 2, 2010

(54) METHOD OF MASS ANALYSIS AND MASS SPECTROMETER

(75) Inventor: Takaya Satoh, Tokyo (JP)

(73) Assignee: JEOL Ltd., Tokyo (JP)

( * ) Notice: Subject to any disclaimer, the term of this patent is extended or adjusted under 35 U.S.C. 154(b) by 400 days.

(21) Appl. No.: 11/853,982

(22) Filed: Sep. 12, 2007

(65) Prior Publication Data

US 2008/0061226 A1 Mar. 13, 2008

(30) Foreign Application Priority Data

Sep. 12, 2006 (JP) ............................ 2006-246311

(51) Int. Cl.
*B01D 59/44* (2006.01)
*G01T 3/00* (2006.01)

(52) U.S. Cl. .................... 250/390.07; 250/281; 702/76; 324/76.19

(58) Field of Classification Search ................. 250/281, 250/282, 286, 287, 288, 299, 390.07; 702/27, 702/76, 83; 324/76.19
See application file for complete search history.

(56) References Cited

U.S. PATENT DOCUMENTS 6,647,347 B1 * 11/2003 Roushall et al. ............... 702/75
6,878,931 B1 * 4/2005 Roushall et al. ............. 250/287
7,129,480 B2 * 10/2006 Roushall et al. ............. 250/287
7,202,471 B2 * 4/2007 Hondo et al. ............... 250/281
7,277,799 B2 * 10/2007 Park ............................ 702/23
7,372,022 B2 * 5/2008 Roushall et al. ............. 250/287
7,547,878 B2 * 6/2009 Schultz et al. .............. 250/282
2005/0146317 A1 * 7/2005 Roushall et al. .......... 324/76.19
2006/0145070 A1 * 7/2006 Hondo et al. ............... 250/288
2007/0114379 A1 * 5/2007 Roushall et al. ............. 250/284
2007/0284521 A1 * 12/2007 Green et al. ................ 250/283
2008/0061226 A1 * 3/2008 Satoh ......................... 250/287

FOREIGN PATENT DOCUMENTS

JP 07-178070 7/1995
JP 2005-134181 5/2005

* cited by examiner

*Primary Examiner*—Bernard E Souw
(74) *Attorney, Agent, or Firm*—The Webb Law Firm

(57) ABSTRACT

Mass analysis method and mass spectrometer in which the S/N of mass spectra does not deteriorate due to accumulation if an ionization method, such as MALDI, producing spectral intensities that are not uniform in time is employed. Every given number of collected mass spectra are accumulated and stored to produce primary accumulation mass spectra. After the measurements, some of the stored primary accumulation spectra are selected according to a given rule based on a time trace of the intensities of the primary accumulation mass spectra. The selected spectra are accumulated to produce a secondary accumulation mass spectrum.

17 Claims, 6 Drawing Sheets

SELECTION OF PRIMARY ACCUMULATION SPECTRA BASED ON TIME AREA SETTING

SELECTION OF PRIMARY ACCUMULATION SPECTRA BASED ON THRESHOLD VALUE SETTING

INFLUENCE OF DRIFT OF A PEAK TO AN ACCUMULATION SPECTRUM

METHOD OF MASS ANALYSIS AND MASS SPECTROMETER

BACKGROUND OF THE INVENTION

1. Field of the Invention

The present invention relates to mass spectrometry and a mass spectrometer used for quantitative analysis and simultaneous qualitative analysis of trace amounts of compounds and for structural analysis of sample ions.

2. Description of Related Art

MALDI (matrix-assisted laser desorption/ionization) is one kind of method of laser ionization. This method uses a matrix (such as liquid, crystalline compound, or metal powder) having an absorption band at the used laser wavelength. A sample is mixed and dissolved in the matrix. Then, the matrix is firmly held on a sample plate. The matrix is irradiated with laser light to vaporize or ionize the sample. Since this is a pulsed ionization method using a pulsed laser, MALDI is compatible with time-of-flight mass spectrometers (TOFMS).

In recent years, a matrix-free ionization method capable of omitting a procedure for mixing a matrix and a sample has been developed. In many cases, a microscopic structure on a sample plate is used.

On the other hand, a TOFMS is a mass spectrometer for finding the mass-to-charge ratios of ions from the times taken for the ions to reach the detector after a given amount of energy is imparted to the ions to accelerate them such that the ions fly. In the TOFMS, the ions are accelerated by a constant pulsed voltage of $V_\alpha$. At this time, from the law of energy conservation, the velocity v of the ions is given by $$\frac{mv^2}{2} = qeV_a \tag{1}$$

$$v = \sqrt{\frac{2qeV}{m}} \tag{2}$$

where m is the mass of each ion, q is the electric charge of each ion, and e is the elementary electric charge.

The ions reach a detector in a flight time of T, the detector being in a position at a given distance of L.

$$T = \frac{L}{v} = L\sqrt{\frac{m}{2qeV}} \tag{3}$$

It can be seen from Eq. (3) that the flight time T varies according to the mass m of the ion. TOFMS is an instrument for separating masses by making use of this principle. One example of a linear TOFMS is shown in FIG. 1. Furthermore, reflectron TOFMS instruments in which the energy focusing can be improved and the flight distance can be prolonged by placing a reflectron field between the ion source and the detector have enjoyed wide acceptance. One example of a reflectron TOFMS is shown in FIG. 2.

TOFMS has two kinds of methods of measuring flight times. In one method, ions created by an ion source are directly extracted with a high pulsed voltage, and the flight time is measured. This is known as the coaxial TOFMS. Frequently, this is combined with a pulsed ion source in use. In the second method, ions created by an ion source are transported with a kinetic energy of about tens of eV. The ions are accelerated with a high pulsed voltage in a direction perpendicular to the direction (axis) of the transportation. Under this condition, the flight time is measured. This is known as the orthogonal acceleration TOFMS. This is often combined with a continuous ion source in use.

An ionization method employing laser irradiation can use both of these TOFMS methods. In the case of the coaxial design, laser irradiation and measurement of flight time are synchronized. In the case of the orthogonal acceleration design, laser irradiation and measurement of flight time are not synchronized. See, for example, Japanese Patent Laid-Open No. H7-178070 and Japanese Patent Laid-Open No. 2005-134181.

MALDI is superior to other ionization methods presently used in mass spectrometry in its ability to ionize highly varied compounds. However, when a matrix material and a sample are mixed and crystallized, a spread of about 1 mm in diameter is often produced. Frequently, the sample is locally present within this area. Ionization is effected by laser irradiation. The diameter of the irradiating laser light is 100 μm, which is sufficiently smaller than the crystallized area. Therefore, there is the problem that the ion intensity varies greatly according to the beam position on the sample due to the localization of the sample. In particular, where the spectral intensity is plotted on the vertical axis of a graph (hereinafter referred to as the time trace) and the data acquisition time is on the horizontal axis, plural spectral peaks appear as shown in FIG. 3.

In an ordinary mass spectrometer, about hundreds to thousands of mass spectra are collected and accumulated. As a result, an accumulated mass spectrum with good signal-to-noise ratio (S/N) is obtained. Because spectra are accumulated randomly during the laser irradiation process, mass spectra with extremely low signal intensities are also collected. In total, the S/N may be deteriorated.

SUMMARY OF THE INVENTION

In view of the foregoing problem, it is an object of the present invention to provide a mass analysis method and mass spectrometer which use an ionization method, such as MALDI, for collecting spectra with intensities that are not uniform in time but which produce an accumulated mass spectrum with good S/N.

A method of mass analysis according to one embodiment of the present invention achieves this object and finds an accumulation mass spectrum by performing multiple mass measurements using a mass spectrometer, collecting mass spectra from the measurements, and accumulating the collected mass spectra. This method comprises the steps of: (a) accumulating every given number of the collected mass spectra and storing resulting spectra as primary accumulation spectra (hereinafter may be referred to as the primary accumulation process); (b) selecting primary accumulation spectra from the stored primary accumulation spectra according to a given rule after the end of the measurements; and (c) accumulating the selected primary accumulation spectra to obtain a secondary accumulation spectrum (hereinafter may be referred to as the secondary accumulation process).

In one preferred feature of the present invention, the mass spectra may be obtained by MALDI.

In another preferred feature of the present invention, the mass spectrometer may be a time-of-flight mass spectrometer.

In a further preferred feature of the present invention, the given rule may be selected one time interval or plural discrete time intervals from a period in which mass spectra are collected such that the primary accumulation spectra in the selected time intervals have good S/N.

In yet another preferred feature of the present invention, the given rule may consist of setting a minimum threshold value for spectral intensities and selecting primary accumulation spectra having intensities exceeding the minimum threshold value.

In still another preferred feature of the present invention, the given rule may consist of further setting a maximum threshold value for spectral intensities and excluding primary accumulation spectra having intensities exceeding the maximum threshold value.

In an additional preferred feature of the present invention, the given rule may consist of (i) selecting one time interval or plural discrete time intervals in which the primary accumulation spectra have high S/N, (ii) simultaneously setting a minimum threshold value for intensities of the primary accumulation spectra, and (iii) selecting the primary accumulation spectra having intensities exceeding the minimum threshold value.

In a still further preferred feature of the present invention, the given rule may consist of further setting a maximum threshold value and excluding primary accumulation spectra having intensities exceeding the maximum threshold value.

In a further preferred feature of the present invention, the given rule may be carried out based on a time trace of intensities of the primary accumulation spectra.

In a further preferred feature of the present invention, the spectral intensities may be intensities of given peaks of collected mass spectra.

In a further preferred feature of the present invention, the spectral intensities may be the intensities of all signals within all ranges of collected mass spectra or within a given range of mass-to-charge ratios.

In a further preferred feature of the present invention, the given rule may consist of selecting primary accumulation spectra in turn out of the collected primary accumulation spectra from a primary accumulation spectrum having the highest S/N and accumulating the selected primary accumulation spectra such that the S/N of the secondary accumulation spectrum is improved best.

In a further preferred feature of the present invention, the given rule may terminate the secondary accumulation process when the S/N of the secondary accumulation spectrum has ceased to be improved.

In a further preferred feature of the present invention, during the primary accumulation process, the mass spectrometer may compensate for drift.

Another embodiment of the present invention provides a mass spectrometer having a function of obtaining an accumulation mass spectrum by performing multiple mass measurements, collecting mass spectra from the measurements, and accumulating the mass spectra. In the spectrometer, every given number of the collected mass spectra is accumulated and stored to produce an accumulation mass spectrum. This process step is repeated to obtain multiple accumulation mass spectra stored. A time trace of intensities of the stored accumulation mass spectra is displayed on a display device.

In another preferred feature of this embodiment, the intensities may be intensities of given peaks of the collected mass spectra.

In a further preferred feature of this embodiment, the intensities may be intensities of all signals within all ranges of collected mass spectra or within a given range of mass-to-charge ratios.

In the method of mass analysis according to the above-described embodiment of the present invention, an accumulation mass spectrum is found by performing multiple mass measurements using a mass spectrometer, collecting mass spectra from the measurements, and accumulating the collected mass spectra. The method of mass analysis comprises the steps of: (a) accumulating every given number of the collected mass spectra and storing resulting spectra as primary accumulation spectra; (b) selecting primary accumulation spectra from the stored primary accumulation spectra according to a given rule after the end of the measurements; and (c) accumulating the selected primary accumulation spectra to obtain a secondary accumulation spectrum.

Consequently, a method of mass analysis can be offered in which the S/N of mass spectra does not deteriorate due to accumulation if an ionization method, such as MALDI, producing spectral intensities that are not uniform in time is employed.

The mass spectrometer according to an embodiment of the present invention has a function of obtaining an accumulation mass spectrum by performing multiple mass measurements, collecting mass spectra from the measurements, and accumulating the mass spectra. In the spectrometer, every given number of the collected mass spectra are accumulated and stored to produce accumulation mass spectra. A time trace of intensities of the accumulation mass spectra can be displayed on a display device. Consequently, a mass spectrometer can be offered in which the S/N of mass spectra does not deteriorate due to accumulation if an ionization method, such as MALDI, producing spectral intensities that are not uniform in time is employed.

Other objects and features of the invention will appear in the course of the description thereof, which follows.

DESCRIPTION OF THE PREFERRED EMBODIMENTS

Embodiments of the present invention are hereinafter described with reference to the accompanying drawings.

Figure 1:
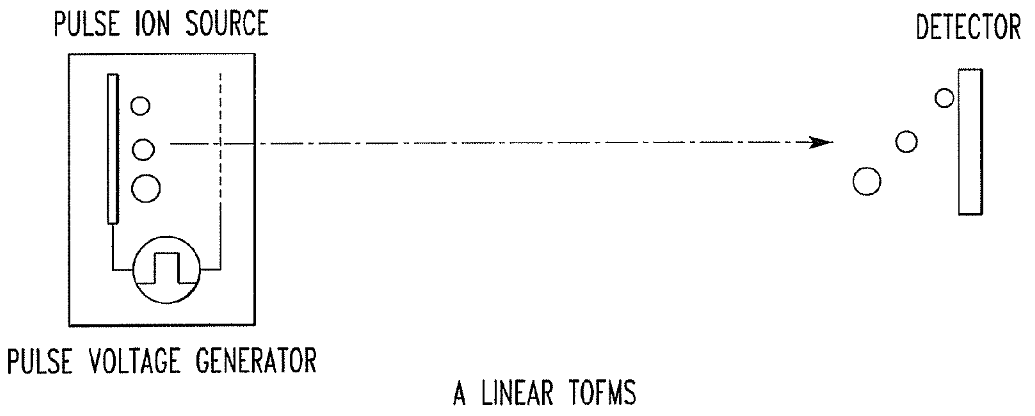
FIG.1 PRIOR ART
FIG. 1 is a schematic diagram of a prior art linear time-of-flight mass spectrometer.
Figure 2:
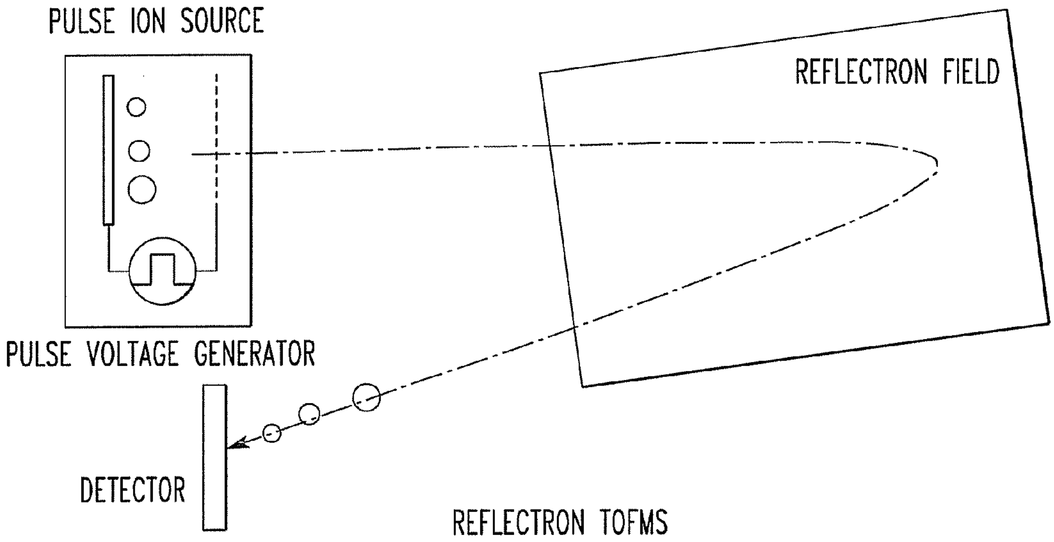
FIG.2 PRIOR ART
FIG. 2 is a schematic diagram of a prior art reflectron time-of-flight mass spectrometer.
Figure 3:
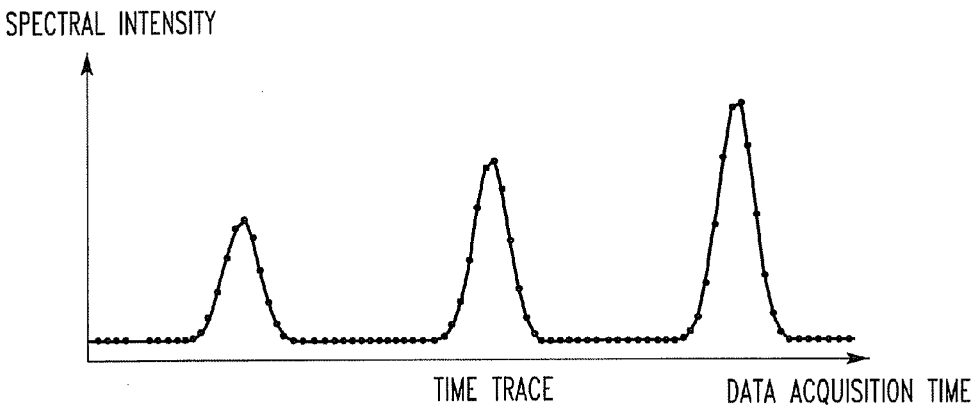
FIG. 3 PRIOR ART
FIG. 3 is a graph showing a time trace of mass spectral intensities observed by a prior art MALDI-TOF-MS method.
Figure 4:
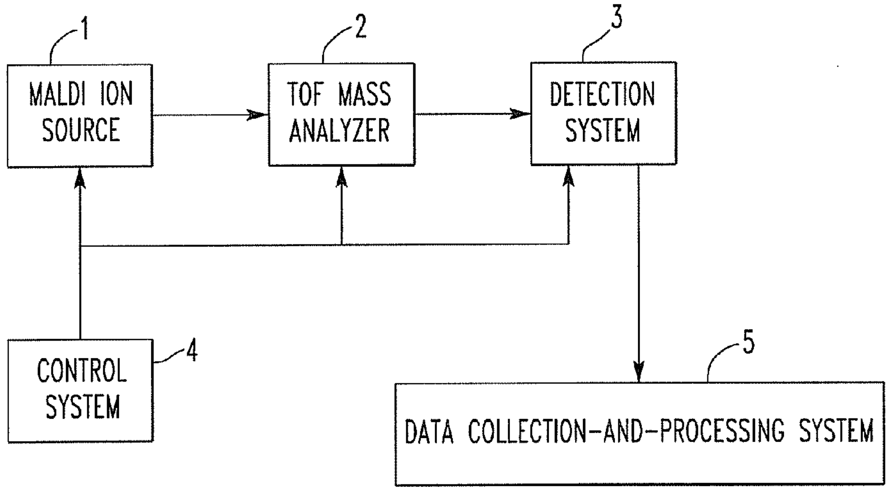
FIG. 4 is a block diagram of a TOF-MS used in the present invention.

FIG. 4 shows a time-of-flight mass spectrometer (TOF-MS) used in the present invention. The spectrometer has a MALDI ion source 1 connected with a TOF mass analyzer 2 via a vacuum portion. A detection system 3 is connected with the output of the mass analyzer 2 via a vacuum portion. The MALDI ion source 1, TOF mass analyzer 2, and detection system 3 are seamlessly controlled by a control system 4, such as a computer. Mass spectral data obtained by the detection system 3 is sent to a data collection-and-processing system 5, where the data is processed and stored. The system 5 is composed of a computer and a storage unit.

In this structure, every tens of mass spectra obtained by the MALDI ion source 1, TOF mass analyzer 2, and detection system 3 are accumulated. The accumulated mass spectra are successively stored as primary accumulation mass spectra in the storage unit within the data collection-and-processing system 5.

At this time, timewise variations of the spectral intensities of the primary accumulation spectra can be displayed as a time trace on a monitor device. The spectral intensities may be the intensities of maximum peaks of the collected mass spectra. Alternatively, the spectral intensities can be a value obtained by accumulating all the signal intensities. Furthermore, the mass range in which the intensity is specified can be the whole mass spectral range or a certain range of mass-to-charge ratios.

After completion of the laser irradiation process and measurements in the MALDI ion source 1, only primary accumulation spectra having signal-to-noise ratios higher than a given value are selected from the stored primary accumulation spectra. Then, the selected primary accumulation spectra are accumulated to create a secondary accumulation spectrum. Since the secondary accumulation process is performed after the end of the measurements, various trial-and-error attempts can be made to derive the best result.

Figure 5:
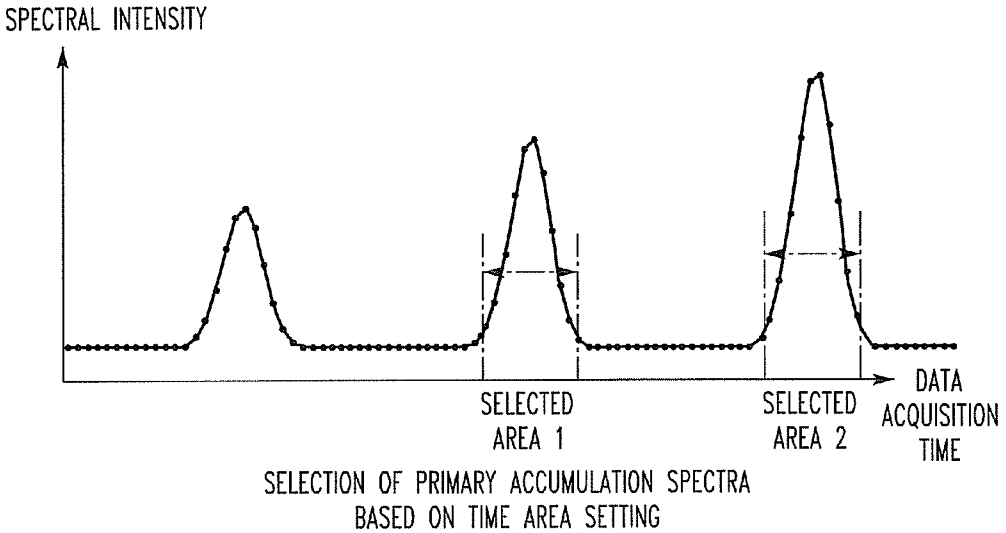
FIG. 5 is a graph illustrating a method for selecting primary accumulation spectra of mass analysis according to the present invention.

The method of selecting primary accumulation spectra to create a secondary accumulation spectrum can assume the following five modes:

1. As shown in FIG. 5, the user selects one time interval or plural discrete time intervals in which the spectral intensities are observed to be high while observing the time trace of the primary accumulation spectra.

2. The user sets a minimum threshold value for spectral intensities while observing the time trace of the primary accumulated spectra, and selects primary accumulation spectra having intensities exceeding the threshold value to exclude spectra having intensities lower than the minimum threshold value.

Figure 6:
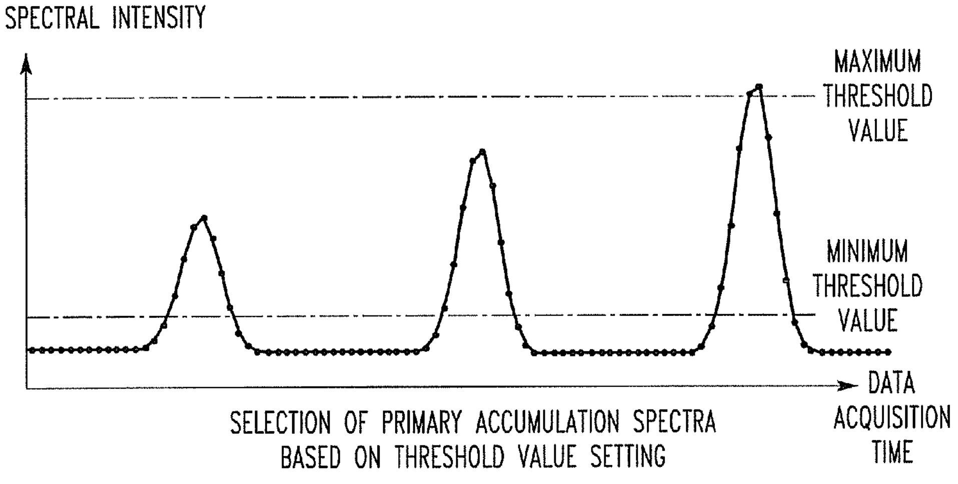
FIG. 6 is a graph illustrating another method for selecting primary accumulation of mass analysis according to the present invention.

3. As shown in FIG. 6, the user sets maximum and minimum threshold values for spectral intensities while observing the time trace of the primary accumulation spectra, and selects the primary accumulation spectra having intensities present between the maximum and minimum threshold values. The minimum threshold value is used to exclude spectra having low intensities. The maximum threshold value is used to exclude primary accumulation spectra having intensities exceeding the maximum threshold value.

Figure 7:
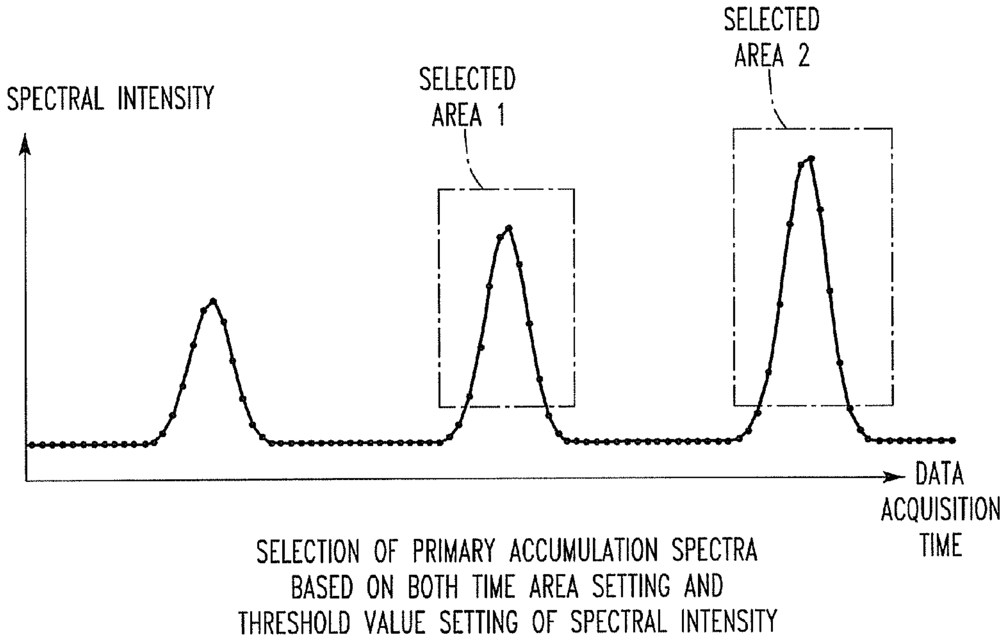
FIG. 7 is a graph illustrating a further method for selecting primary accumulation spectra of mass analysis according to the present invention.

4. As shown in FIG. 7, the modes 1 and 3 described above may be combined as mode 4. Alternatively, modes 1 and 2 may be combined.

5. Primary accumulation spectra are automatically selected and accumulated in succession from the strongest spectrum. The accumulation is so performed that the resulting secondary accumulation spectrum has the best S/N. During this step, the S/N of the secondary accumulation spectrum is constantly monitored. The secondary accumulation process is automatically terminated when the S/N has ceased to be improved.

Figure 8:
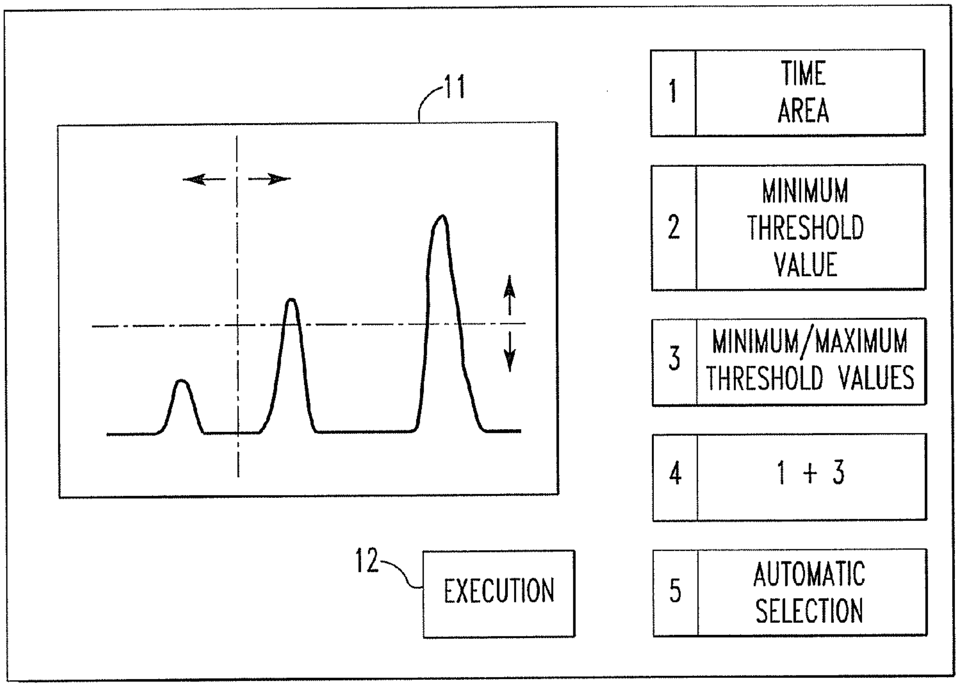
FIG. 8 is a diagram illustrating one example of a graphic user interface for use in a mass spectrometer according to the present invention.

FIG. 8 shows an example of a graphic user interface permitting the user to select such modes and to enter various conditions including time intervals and threshold values. A window 11 displays a time trace of primary accumulation mass spectra. Command buttons permitting the user to select the five modes are displayed on the right side of the window.

When the "mode 1" button is clicked on, a vertical cursor line is displayed in the window 11. One time interval or plural discrete time intervals in which spectral intensities are observed to be high can be set while watching the time trace of the primary accumulation spectra by moving the cursor line with the keyboard or mouse. After the setting, if "execution key 12" is clicked on, a secondary accumulation process is performed within the time interval or intervals. This is the mode 1 described above.

When the "mode 2" button is clicked on, a horizontal cursor line is displayed in the window 11. A minimum threshold value for spectral intensities can be set while watching the time trace of the primary accumulation mass spectra by moving the cursor line with the keyboard or mouse. After the setting, if the execution key 12 is clicked on, a secondary accumulation process is performed in regions having intensities exceeding the threshold value. This is the mode 2 described above.

When the "mode 3" button is clicked on, a horizontal cursor line is displayed in the window 11. Minimum and maximum threshold values for spectral intensities can be set while watching the time trace of the primary accumulation spectra by moving the cursor line with the keyboard or mouse. After the setting, if the execution key 12 is clicked on, a secondary accumulation process is carried out within the range delineated by the threshold values. This is the mode 3 described above.

When the "mode 4" button is clicked on, a cursor-driven rubber band is displayed in the window. In one time interval or plural discrete time intervals in which spectral intensities are observed to be high, minimum and maximum threshold values for spectral intensities can be simultaneously set while watching the time trace of the primary accumulation spectra by stretching or contracting the rubber band with the keyboard or mouse. After the setting, if the execution key 12 is clicked on, a secondary accumulation process is carried out within the time intervals and within the range delineated by the threshold values. This is the mode 4 described above.

If the "mode 5" is selected and the execution key 12 is clicked on, primary accumulation spectra are automatically selected in turn from the spectrum having the highest intensity, and a secondary accumulation process is carried out. At this time, the variations in the S/N of the secondary accumulation spectrum are displayed in terms of characters at all times. The secondary accumulation process is automatically terminated when the S/N has ceased to be improved. This is the mode 5 described above. If timewise variations in the S/N are graphically displayed during the secondary accumulation process, the variations in the S/N can be monitored on a real-time basis.

In TOFMS, as the temperature varies with time, the flight distance in the flight tube and power-supply voltage drift. Consequently, if ions having the same mass-to-charge ratio are being measured, the values of the mass-to-charge ratios of mass peaks often deviate.

Figure 9:
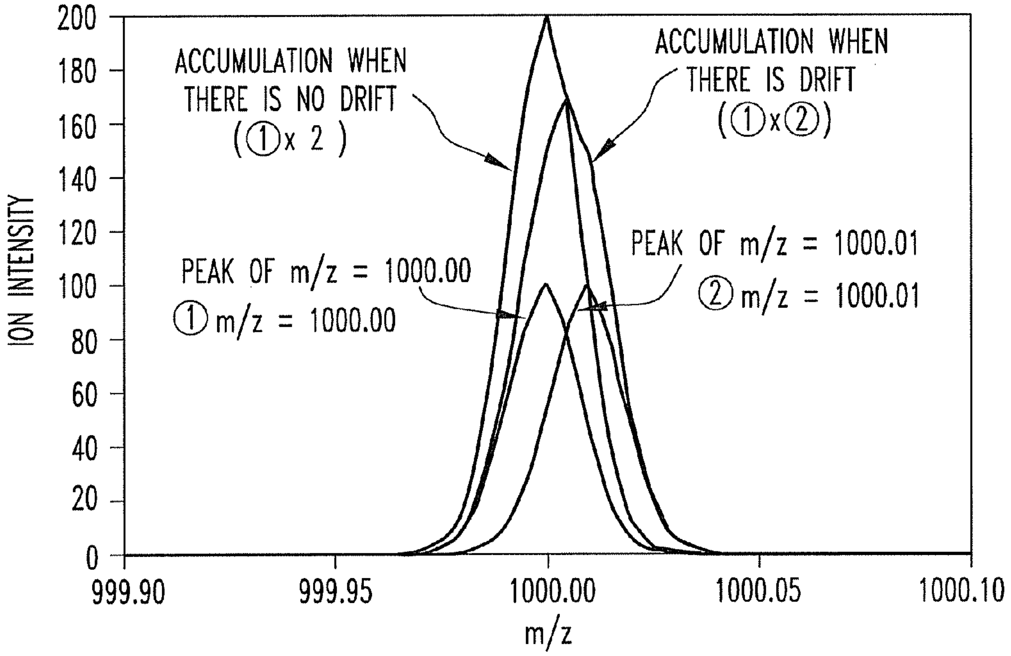
FIG. 9 is a graph illustrating the effects of mass peak drift.

As shown in FIG. 9, if mass peaks drift, the S/N will not be improved by accumulation, as a matter of course. In addition, the mass peaks broaden, leading to a deterioration of the resolution.

Accordingly, an accumulation process can be performed more effectively if the process is performed after selecting at least one mass peak providing a reference from each spectrum and correcting the mass-to-charge ratio axis such that the value of the mass-to-charge ratio of the selected mass peak becomes equal to a given value. If the specified mass peaks are all originated from known substances, the given value is a theoretical value. If there is any unknown substance, the given value is the value of the mass-to-charge ratio in the mass spectrum first derived.

The present invention can be applied to a wide range of mass spectrometers.

Having thus described my invention with the detail and particularity required by the Patent Laws, what is desired protected by Letters Patent is set forth in the following claims.

The invention claimed is:

1. A method of mass analysis for finding an accumulation mass spectrum by performing multiple mass measurements using a mass spectrometer, collecting mass spectra from the measurements, and accumulating the collected mass spectra, said method of mass analysis comprising the steps of:

(a) accumulating every given number of the collected mass spectra and storing resulting spectra as primary accumulation spectra;

(b) selecting primary accumulation spectra from the stored primary accumulation spectra according to a given rule after the end of the measurements; and (c) accumulating the selected primary accumulation spectra to obtain a secondary accumulation spectrum.

2. A method of mass analysis as set forth in claim 1, wherein said mass spectra are obtained by MALDI (matrix-assisted laser desorption/ionization).

3. A method of mass analysis as set forth in claim 1 or 2, wherein said mass spectrometer is a time-of-flight mass spectrometer.

4. A method of mass analysis as set forth in claim 1 or 2, wherein said rule is to select one time interval or plural discrete time intervals from a period in which mass spectra are collected such that the primary accumulation spectra in the selected time intervals have good S/N.

5. A method of mass analysis as set forth in claim 1 or 2, wherein said given rule consists of setting a minimum threshold value for spectral intensities and selecting primary accumulation spectra having intensities exceeding the minimum threshold value.

6. A method of mass analysis as set forth in claim 5, wherein said given rule consists of further setting a maximum threshold value and excluding primary accumulation spectra having intensities exceeding the maximum threshold value.

7. A method of mass analysis as set forth in claim 1 or 2, wherein said given rule consists of (i) selecting one time interval or plural discrete time intervals in which the primary accumulation spectra have high S/N, (ii) simultaneously setting a minimum threshold value for intensities of the primary accumulation spectra, and (iii) selecting the primary accumulation spectra having intensities exceeding the minimum threshold value.

8. A method of mass analysis as set forth in claim 7, wherein said given rule consists of further setting a maximum threshold value and excluding the primary accumulation spectra having intensities exceeding the maximum threshold value.

9. A method of mass analysis as set forth in claim 1, wherein said given rule is carried out based on a time trace of intensities of the primary accumulation spectra.

10. A method of mass analysis as set forth in claim 1, wherein said spectral intensities are intensities of given peaks of the collected mass spectra.

11. A method of mass analysis as set forth in claim 1, wherein said spectral intensities are intensities of all signals within all ranges of collected mass spectra or within a given range of mass-to-charge ratios.

12. A method of mass analysis as set forth in claim 1, wherein said given rule consists of selecting primary accumulation spectra in turn out of the collected primary accumulation spectra from a primary accumulation spectrum having highest S/N and accumulating the selected primary accumulation spectra such that S/N of said secondary accumulation spectrum is improved best.

13. A method of mass analysis as set forth in claim 12, wherein said given rule is to terminate accumulation for obtaining said secondary accumulation spectrum when S/N of the secondary accumulation spectrum has ceased to be improved.

14. A method of mass analysis as set forth in claim 1, wherein the mass spectrometer is compensated for drift during the step (a) for obtaining the primary accumulation spectra.

15. A mass spectrometer having a function of obtaining an accumulated mass spectrum by performing multiple mass measurements, collecting mass spectra from the measurements, and accumulating the mass spectra, wherein every given number of the collected mass spectra are accumulated and stored to produce accumulation mass spectra, and wherein a time trace of intensities of the accumulation mass spectra is displayed on a display device.

16. A mass spectrometer as set forth in claim 15, wherein said intensities of the accumulation mass spectra are intensities of given peaks of the collected mass spectra.

17. A mass spectrometer as set forth in claim 15, wherein said intensities of the accumulation mass spectra are intensities of all signals within all ranges of collected mass spectra or within a given range of mass-to-charge ratios.

* * * * *